United States Patent
Park et al.

(10) Patent No.: US 12,538,329 B2
(45) Date of Patent: Jan. 27, 2026

(54) METHOD AND APPARATUS FOR DETERMINING TRANSMISSION PRIORITY OF UPLINK MAC PDU OF RELAY TERMINAL IN NR V2X

(71) Applicant: LG Electronics Inc., Seoul (KR)

(72) Inventors: Giwon Park, Seoul (KR); Seoyoung Back, Seoul (KR); Seungmin Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 18/017,220

(22) PCT Filed: Jul. 20, 2021

(86) PCT No.: PCT/KR2021/009322
§ 371 (c)(1),
(2) Date: Jan. 20, 2023

(87) PCT Pub. No.: WO2022/019608
PCT Pub. Date: Jan. 27, 2022

(65) Prior Publication Data
US 2023/0276463 A1    Aug. 31, 2023

(30) Foreign Application Priority Data

Jul. 20, 2020   (KR) .................. 10-2020-0089374
Jul. 24, 2020   (KR) .................. 10-2020-0092104

(51) Int. Cl.
*H04W 72/25* (2023.01)
*H04W 72/1263* (2023.01)
*H04W 72/566* (2023.01)

(52) U.S. Cl.
CPC ....... *H04W 72/25* (2023.01); *H04W 72/1263* (2013.01); *H04W 72/566* (2023.01)

(58) Field of Classification Search
None
See application file for complete search history.

(56) References Cited

U.S. PATENT DOCUMENTS

2019/0364554 A1   11/2019   Kuang et al.
2022/0264596 A1*   8/2022   Chen ................. H04W 72/20
(Continued)

FOREIGN PATENT DOCUMENTS

KR       20190132490       11/2019
WO     WO 2019/033407       2/2019

OTHER PUBLICATIONS

Huawei & HiSilicon, "Discussion on remaining MAC open issues for 5G V2X with NR SL," R2-2005492, Presented at 3GPP TSG-RAN WG2 Meeting #110 electronic Jun. 1-12, 2020, 45 pages.
(Continued)

*Primary Examiner* — Saumit Shah
(74) *Attorney, Agent, or Firm* — Fish & Richardson P.C.

(57) ABSTRACT

Proposed is a method of operating a first device (100) in a wireless communication system. The method may comprise the steps of: receiving, through a physical sidelink control channel (PSCCH), first SCI for scheduling a physical sidelink shared channel (PSSCH) and second sidelink control information (SCI) from a second device (200); receiving, through the PSSCH related to the PSCCH, the second SCI and first data from the second device (200); and transmitting, on the basis of a value related to an uplink (UL) priority of the first data and a value related to a UL priority of second data, the first data or the second data to a base station (300) through a physical uplink shared channel (PUSCH).

10 Claims, 20 Drawing Sheets

(56) References Cited

U.S. PATENT DOCUMENTS

| | | | |
|---|---|---|---|
| 2022/0279537 A1* | 9/2022 | Freda | H04W 72/569 |
| 2022/0312438 A1* | 9/2022 | Yi | H04W 72/569 |
| 2023/0059550 A1* | 2/2023 | Yao | H04L 1/1812 |
| 2023/0082690 A1* | 3/2023 | Yoshioka | H04W 52/383 |
| | | | 370/329 |

OTHER PUBLICATIONS

LG Electronics Inc., "Summary of MAC open issues for NR sidelink," R2-2005725, Presented at 3GPP TSG-RAN WG2 #110-e, Online, Apr. 20-30, 2020, 12 pages.

\* cited by examiner

METHOD AND APPARATUS FOR DETERMINING TRANSMISSION PRIORITY OF UPLINK MAC PDU OF RELAY TERMINAL IN NR V2X

CROSS-REFERENCE TO RELATED APPLICATIONS

This application is a National Stage application under 35 U.S.C. § 371 of International Application No. PCT/KR2021/009322, filed on Jul. 20, 2021, which claims the benefit of Korean Patent Application No. 10-2020-0089374, filed on Jul. 20, 2020 and Korean Patent Application No. 10-2020-0092104, filed on Jul. 24, 2020. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

In an embodiment, an operation method of a first device 100 in wireless communication system may be proposed. The method may comprise: receiving, from a second device 200, first sidelink control information (SCI) for scheduling a physical sidelink shared channel (PSSCH) and second SCI, through a physical sidelink control channel (PSCCH); receiving, from the second device 200, the second SCI and first data, through the PSSCH related to the PSCCH; and transmitting, to a base station 30), the first data or second data, based on a value related to an uplink (UL) priority of the first data and a value related to a UL priority of the second data, through a physical uplink shared channel (PUSCH).

The user equipment (UE) can efficiently perform SL communication.

DESCRIPTION OF EXEMPLARY EMBODIMENTS

Figure 1:
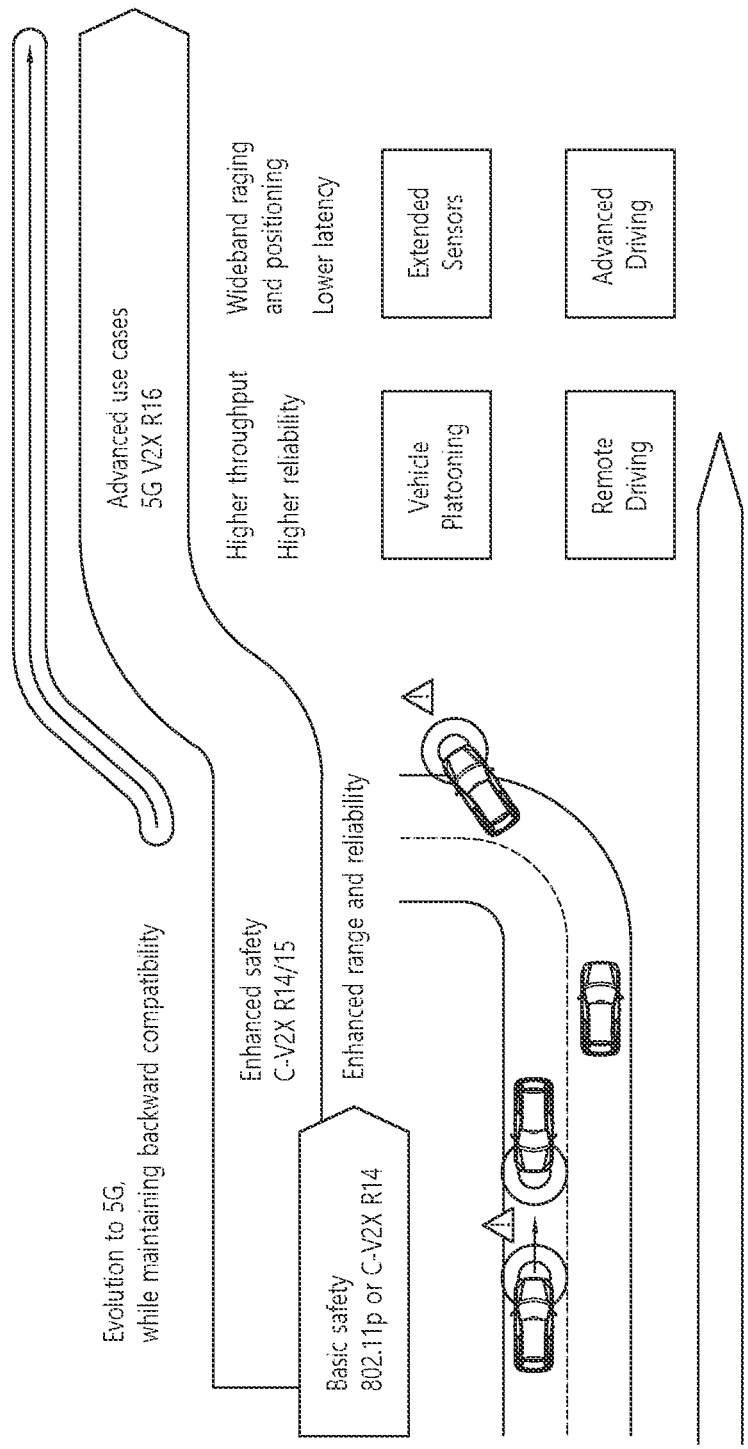
FIG. 1 is a drawing for describing V2X communication based on NR, compared to V2X communication based on RAT used before NR.

In the present specification. "A or B" may mean "only A", "only B" or "both A and B." In other words, in the present specification, "A or B" may be interpreted as "A and/or B". For example, in the present specification, "A. B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A. B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A. B. and/or C" may mean "at least one of A. B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
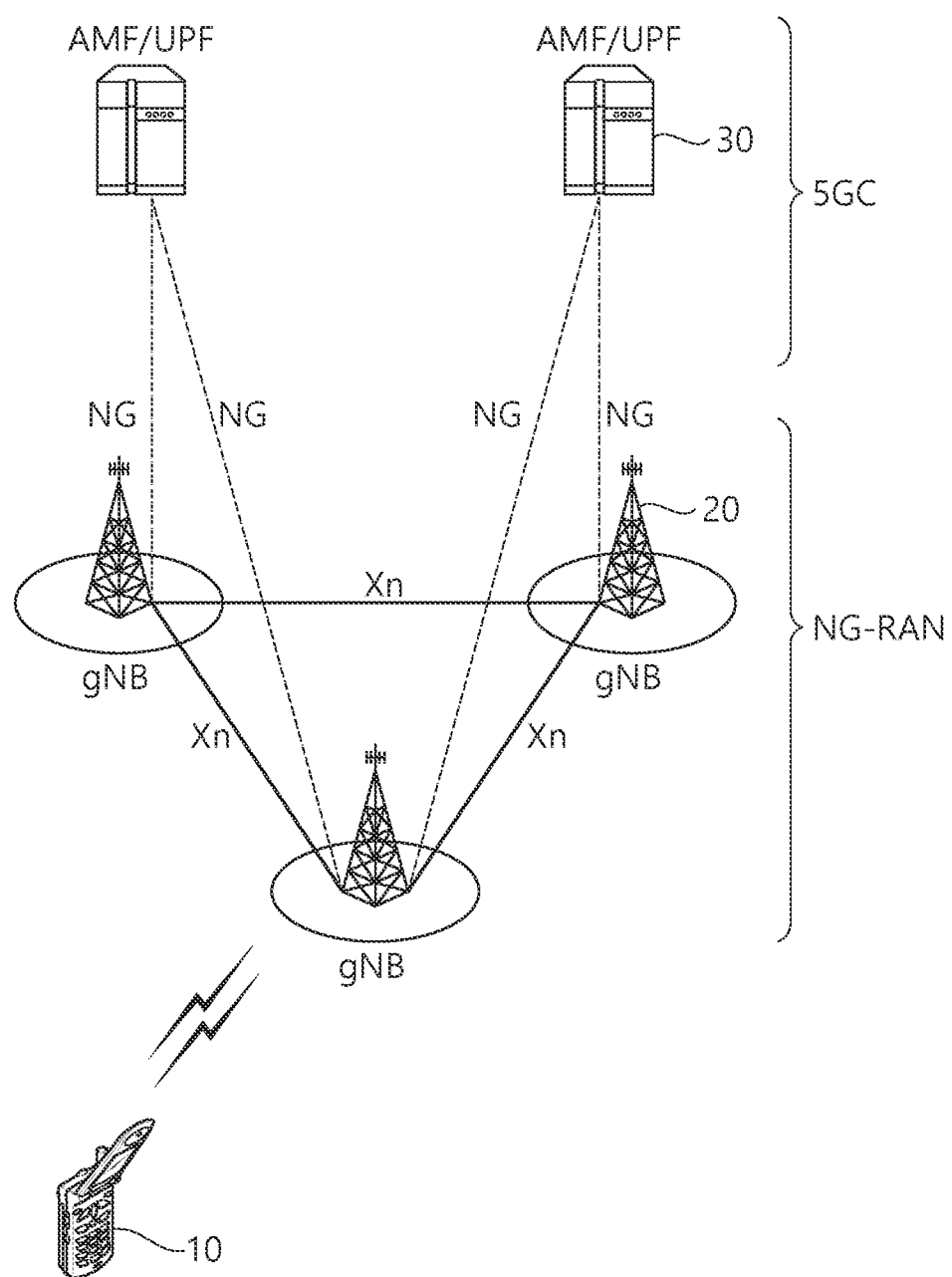
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
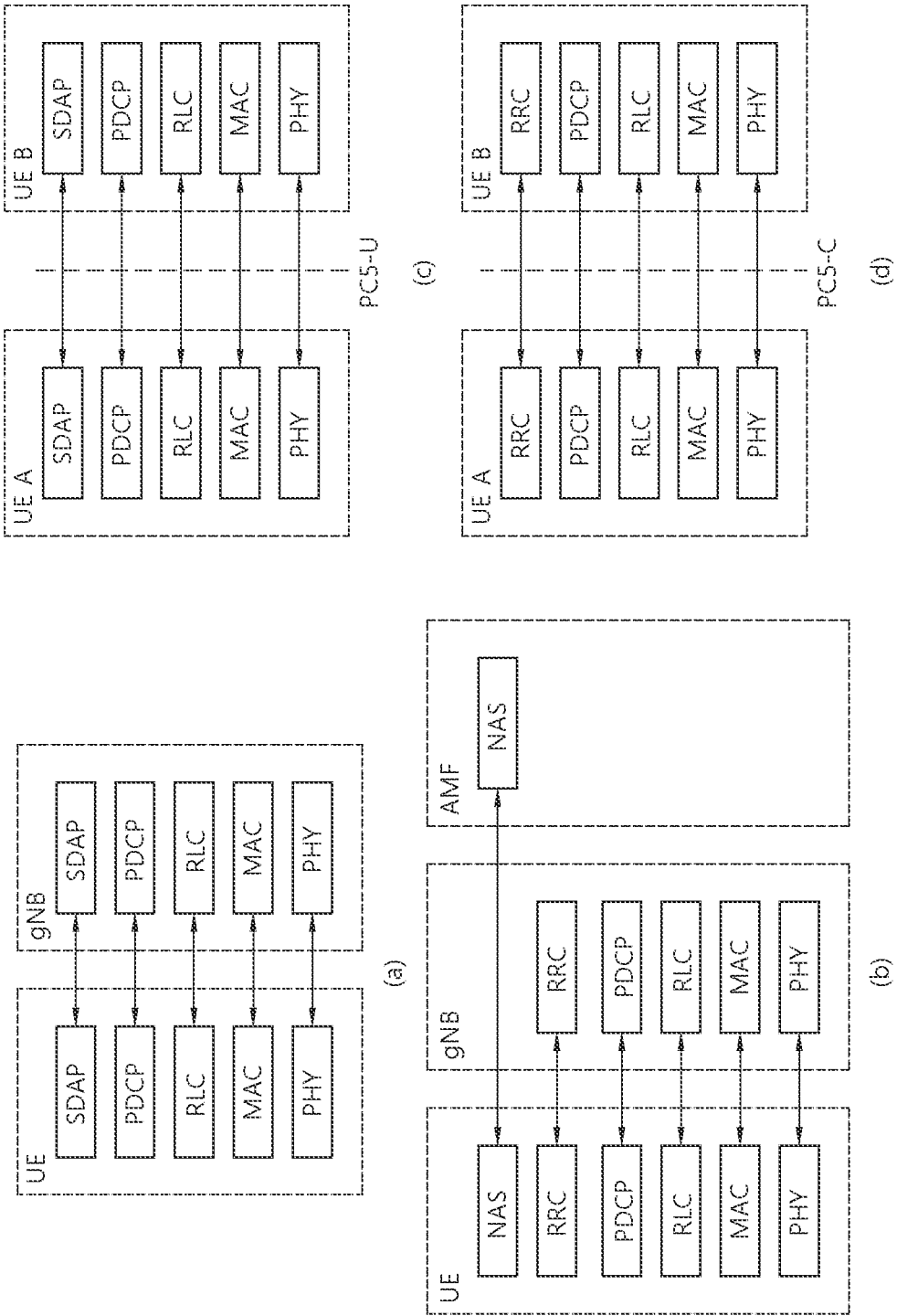
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
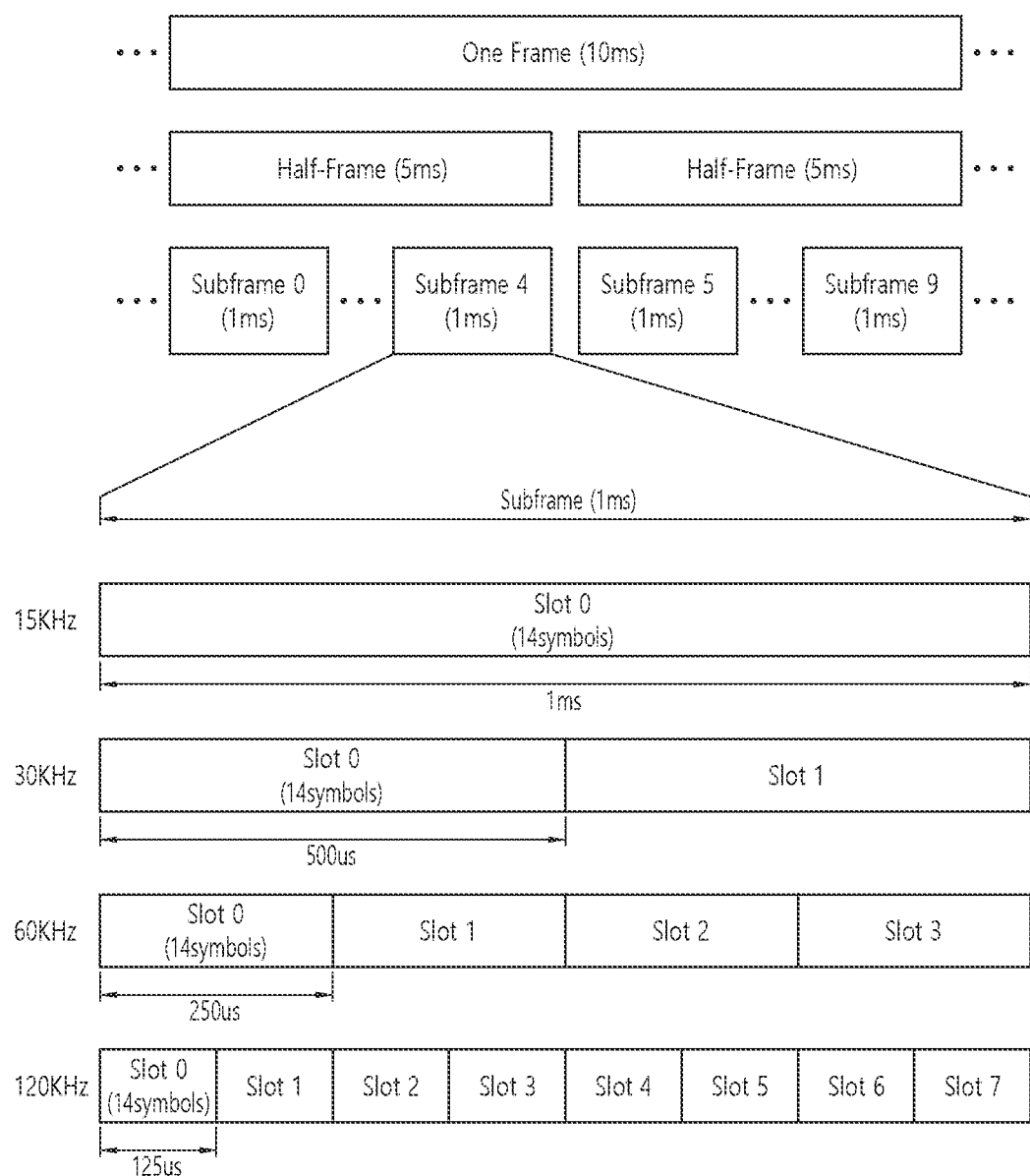
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{surframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 KHz |
| FR2 | 24250 MHz-52600 MHz | 60, 120, 240 KHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 KHz |
| FR2 | 24250 MHz-52600 MHz | 60, 120, 240 KHz |

Figure 5:
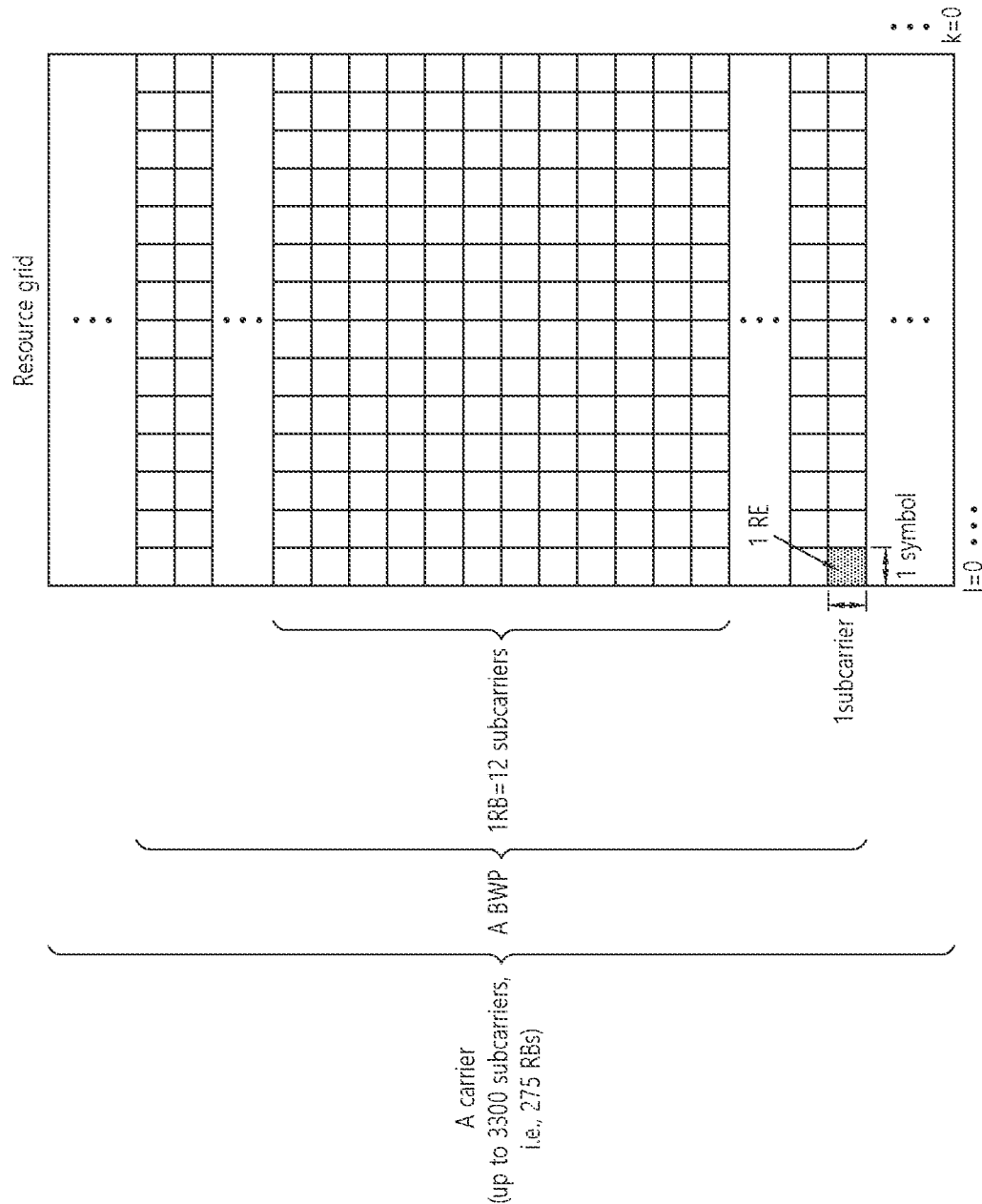
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
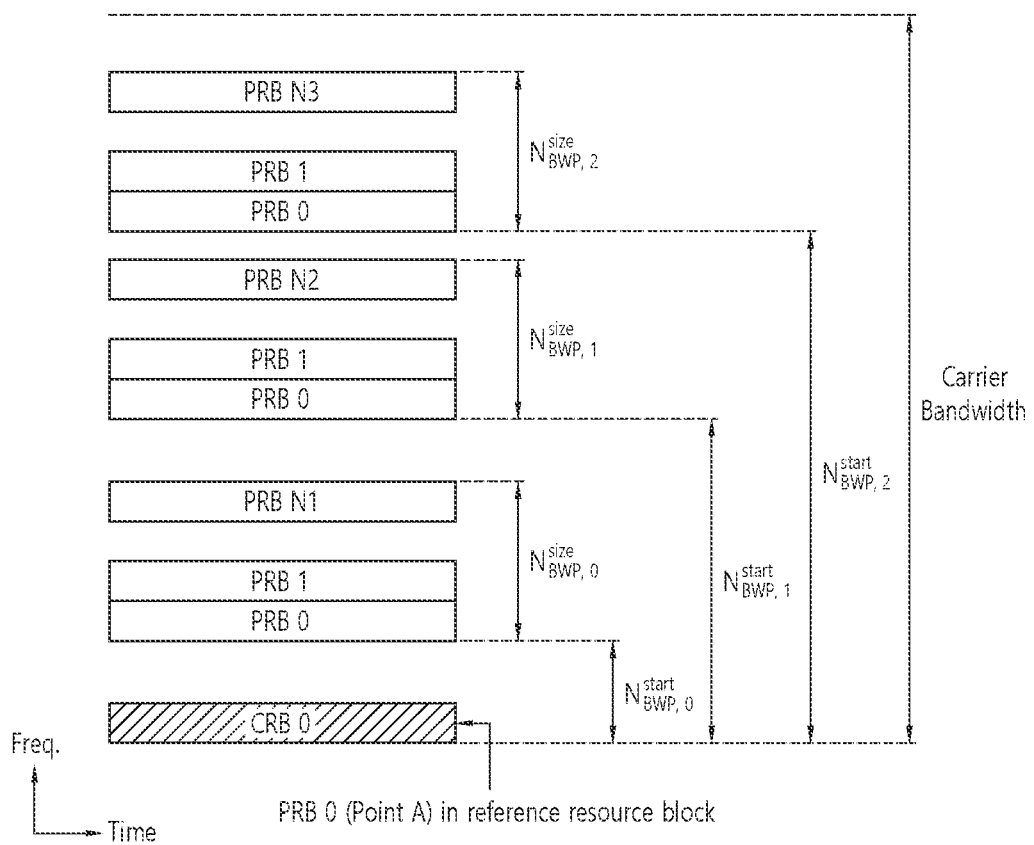
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SLspecific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
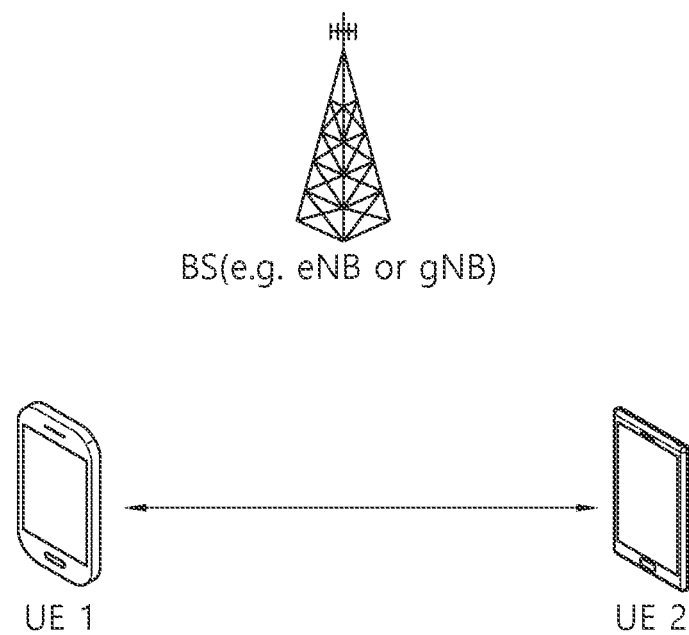
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
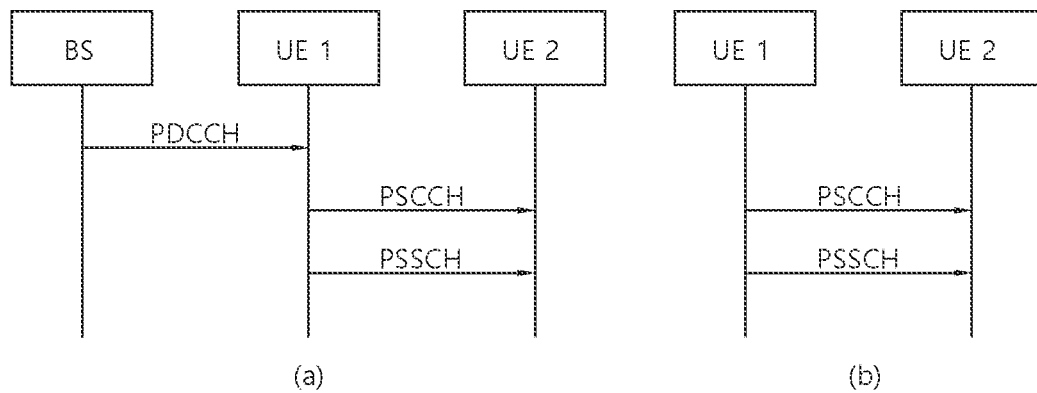
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
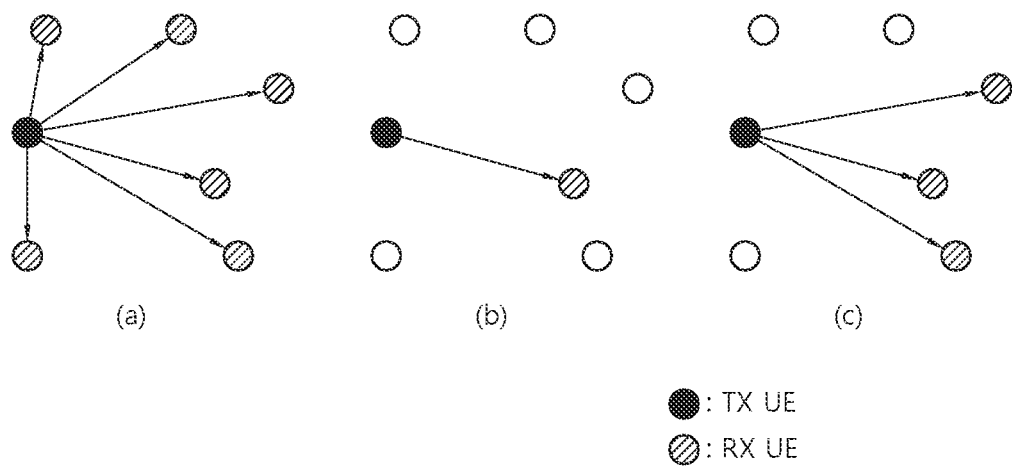
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically. (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

On the other hand, in the conventional NR V2X, if a UE simultaneously has sidelink data to be transmitted to other UEs and uplink data to be transmitted to a base station, and simultaneous transmission is not supported, since only one of the two data can be transmitted, a method of determining transmission priorities for sidelink data and uplink data is supported. That is, in the conventional NR V2X, data with a high priority could be transmitted first through a method of determining transmission priorities for sidelink data and uplink data.

However, there is a problem in that the conventional transmission priority determination method cannot be applied in a relay communication environment. For example, when a remote UE transmits relay data that needs to be transmitted to a base station to a relay UE, the relay UE has relay data (data of the remote UE that the remote UE needs to forward to a base station) received from the remote UE, and at the same time, the relay UE may also have its own uplink data (uplink data of the relay UE itself, not relay data transmitted by the remote UE). Here, if simultaneous transmission of the relay data and the uplink data is not supported in the relay UE, only an uplink MAC PDU for one of the relay data and the uplink data (related to one of the relay data and the uplink data) may be transmitted to the base station. For example, when simultaneous transmission of the relay data and the uplink data is not supported may include when multiplexing relay data and uplink data into one uplink MAC PDU is not supported. Even if it is possible for a relay UE to transmit relay data and uplink data through one uplink MAC PDU, there may be a case in which only one of the relay data and the uplink data can be transmitted, when both the relay data and the uplink data are not accommodated in an uplink grant allocated to the relay UE from a base station. For example, a case in which relay data and uplink data can be transmitted through one uplink MAC PDU may include a case in which multiplexing of relay data and uplink data in one uplink MAC PDU is supported.

In order to solve the problem in the above scenario, a method of determining transmission priorities for relay data and uplink data in a relay UE may need to be supported. However, this method is not currently supported in NR V2X.

Therefore, in this disclosure, by providing a method for determining transmission priorities for relay data and uplink data, a method of a relay UE for transmitting data determined to have a high priority among relay data and uplink data first, based on the priority determination method is proposed.

Proposal 1. According to an embodiment of the present disclosure, a priority determination method for determining which data to transmit with priority when a relay UE can transmit only one of uplink data for relay data transmission and uplink data of the relay UE itself is proposed. In addition, a priority that a UE can use to determine/assign high transmission priority among relay data (uplink MAC PDU, uplink data including relay data) and uplink data (that is, an uplink MAC PDU transmitted to a base station by a relay UE for its own uplink data, separate from the relay data) in the proposed priority determination method is defined. That is, a method is proposed in which a relay UE compares a priority of relay data with that of an uplink data, gives higher priority to data having a smaller priority value, and transmits the uplink MAC PDU of the corresponding data to a base station first. For example, a smaller priority value may be defined as a higher priority. For example, the following description may be equally/similarly applied even when a priority is higher as the priority value is greater.

In the present disclosure, the following method is proposed so that a relay UE can determine transmission priority between relay data and uplink data.

Proposal 1.1. According to an embodiment of the present disclosure, a method of determining data to be transmitted first to a base station by performing direct comparison between a priority of relay data and a priority of uplink data is proposed.

For example, if a relay UE has relay data and uplink data at the same time, and only one of the two data (uplink MAC PDU) can be transmitted to a base station, the relay UE may perform direct comparison between a priority of relay data and a priority of uplink data. For example, both the relay data and the uplink data may be uplink MAC PDUs transmitted by the relay UE to the base station. For example, the relay UE may preferentially transmit an Uplink MAC PDU having a smaller priority value to the base station after direct comparison between priorities. For example, if a priority value of the logical channel having the highest priority among logical channel(s) of an uplink MAC PDU including the relay data is "2", a priority value of the highest priority among logical channels of an uplink MAC PDU including the uplink data is "3", since the priority value of the Uplink MAC PDU for the relay data is smaller, the relay UE may select to transmit the uplink MAC PDU for the relay data to the base station first instead of the uplink data. For example, the priority of the logical channel having the highest priority among the above-mentioned logical channels is the highest priority among the priorities of the logical channels of the uplink MAC PDU for the relay data, or the highest priority among the priorities of logical channels related to the relay data. That is, for example, it may be 'the value of the highest priority of the logical channel(s) in the uplink MAC PDU which is including the relay MAC PDU'.

Also, for example, the highest priority value among logical channels related to a MAC PDU for relay data proposed through proposal 1.1 above may be indicated through a PSCCH (SCI) or when multiple packets are present is a physical layer, it may be used to determine which packet is to be transmitted first. That is, in a physical layer, when a collision for transmission occurs because of the presence of multiple packets, the packet with the highest priority may be transmitted first.

Proposal 1.2. According to an embodiment of the present disclosure, a method of converting the highest priority (sidelink priority, that is a priority of a logical channel related to a MAC PDU received from a remote UE) among logical channels mapped to a received MAC PDU to a priority of an uplink MAC PDU when a relay UE receives the MAC PDU (a MAC PDU received from a remote UE, a sidelink MAC PDU) for relay data from a remote UE is proposed. And, for example, a method is proposed so that an uplink MAC PDU for data with a high priority can be transmitted to a base station first when a relay UE simultaneously has uplink data and relay data to be transmitted to the base station, through the priority direct comparison method proposed in Proposal 1.1. For example, a method such as a table, a conversion formula, or a scaling (factor) that is pre-configured or instructed/transmitted through higher layer/physical layer signaling may be used for the conversion.

For example, relay data (data that a remote UE has to transmit to a base station) transmitted from a remote UE to a relay UE may be a sidelink MAC PDU because it is a MAC PDU delivered to the relay UE through a sidelink (PC5 Link). That is, a priority of a logical channel for a sidelink MAC PDU may be a sidelink priority. However, when faced with the case where the relay UE simultaneously has uplink data as well as the relay data, and can transmit only one of the two data to a base station, the relay UE may perform a process of comparing the highest priority among priorities of logical channels for a MAC PDU for the received relay data with the highest priority among priorities of logical channels for an uplink MAC PDU for uplink data, through the method proposed in the Proposal 1.1. For example, the MAC PDU for the relay data may be a sidelink MAC PDU when received and an Uplink MAC PDU when transmitted to a base station. For example, the logical channel for the MAC PDU for relay data may be a sidelink logical channel when receiving and an uplink logical channel when transmitting to a base station. For example, the priority of the logical channel for the MAC PDU for the relay data may be a sidelink priority when receiving and an uplink priority when transmitting to a base station. However, direct comparison between a sidelink priority and an uplink priority may not be possible when a relay UE compares priorities. This is because it may be impossible to infer an uplink priority from a sidelink priority. Therefore, in the present disclosure, a method is proposed in which a remote UE or a relay UE converts a sidelink priority for relay data (that is, data transferred to a base station which is a destination by a remote UE, a Sidelink MAC PDU received from the remote UE, which has not yet been converted into uplink data for transmission to a base station by the relay UE after the remote UE has transmitted it to the relay UE) into an uplink priority so that the relay UE can directly compare the priority of relay data and the priority of uplink data. That is, a remote UE or a relay UE may let relay data have a priority of a logical channel of an Uplink PDU linked (or mapped) with a sidelink priority. Through this method, upon receiving a sidelink MAC PDU for relay data from the remote UE, the relay UE may derive the priority of an uplink logical channel for an uplink MAC PDU from the sidelink priority. The following is a specific example.

(Method 1) According to am embodiment of the present disclosure, when a remote UE transmits relay data (data whose destination is a base station) to a relay UE, the remote UE may transmit a PSCCH (SCI) related to a relay data (PSSCH) by including a sidelink priority. For example, a sidelink priority may be the highest priority among priorities of sidelink logical channels of a sidelink MAC PDU for relay data. For example, when the relay UE receives relay data from a remote UE, the relay UE has its own uplink data to transmit to a base station at the same time, and the relay UE cannot transmit the two data at the same time, to perform the direct comparison of priorities described in the Proposal 1.1, the relay UE may perform a process of mapping a sidelink priority included in a PSCCH (SCI) related to relay data to an uplink priority. For example, this operation may be possible because a relay UE has been proposed to pre-configure the priority of a logical channel of an uplink PDU, that is linked with a sidelink priority. Through this, a relay UE can directly compare the priority of relay data and the priority of uplink data.

(Method 2) According to an embodiment of the present disclosure, when forwarding relay data (data whose destination is a base station) to a relay UE, a remote UE may convert a sidelink priority to an uplink priority and include the sidelink priority in a PSCCH (SCI) related to the relay data (PSSCH). For example, a sidelink priority may be the highest priority among priorities of sidelink logical channels of a sidelink MAC PDU for relay data. For example, this operation may be possible because a relay UE has been proposed to pre-configure the priority of a logical channel of an uplink PDU, that is linked with a sidelink priority. For example, when the relay UE receives relay data from a remote UE, the relay UE has its own uplink data to transmit to a base station at the same time, and the relay UE cannot transmit the two data at the same time, the relay UE may perform the direct comparison of priorities described in the Proposal 1.1. Through this, the relay UE may directly compare a priority (in a state where it is converted to an uplink priority and included in SCI) of relay data with a priority of uplink data (relay UE's own uplink data).

(Method 3) According to an embodiment of the present disclosure, as another method, a base station may pre-configure uplink priority information mapped with a sidelink priority and transmit it to a remote UE and a relay UE. The remote UE or the relay UE may perform a process of (Method 1), (Method 2) of the Proposal 1.2 using a mapping priority obtained from the base station. For example, the mapping priority may be information including a mapping relationship of a sidelink priority and an uplink priority.

For example, an embodiment below is an embodiment of an uplink data transmission of a relay UE where the priority determination method between relay data and uplink data, proposed in the present disclosure is applied.

step 1. A PC5 unicast link between a remote UE and a relay UE may be configured.

step 2. The remote UE may transfer, to a base station, information of the relay UE which relays the QoS requirements of relay data and the relay data to the base station, by including it in sidelink UE information. For example, the QoS requirements may include Packet Delay Budget, Packet Error Rate, etc. For example, the information of the relay UE may include UE identifier information of the relay UE, that is a Layer 2 Source ID of a relay UE.

step 3. Based on the QoS requirements information of the relay data transmitted by the remote UE and the information of the relay UE, the base station may configure mapping information of "a sidelink priority for relay data" and "an uplink priority for uplink data for transferring relay data to a base station" and transfer it to the relay UE. The relay UE may transfer the above mapping information to the remote UE through PC5 RRC message.

step 4. When relay data is generated, the remote UE may convert a sidelink priority into an uplink priority, and transfer it to a relay UE by including it into a PSCCH (SCI) related to relay data (PSSCH). For example, this operation may be possible because the remote UE has received a priority of a logical channel of an uplink PDU from a base station, that is linked with a sidelink priority. The sidelink priority may be the highest priority among the priorities of sidelink logical channels of the Sidelink MAC PDU for the relay data.

step 5. The remote UE may transmit the PSSCH (Relay Data) to the relay UE.

step 6. The relay UE may receive the relay data from the remote UE, and the relay UE's own uplink data which is to be transmitted by the relay UE to a base station may be generated in the relay UE.

step 7. The relay UE may determine a priority between relay data and uplink data based on the priority determination method proposed in the present disclosure.

step 8. The relay UE may select and transmit data with a smaller priority value first to a base station, by comparing priority values of the relay UE and the uplink data. In the embodiment, uplink data has a smaller priority value than relay data, accordingly is shows an embodiment where the relay UE may select the uplink data and transmit it to a base station.

step 9. When relay data has a smaller priority value than uplink data, it may show an embodiment where the relay UE selects and transmits relay data to a base station.

For example, a process of selecting which data to transmit to a base station through direct comparison of priorities (step 8 or step 9) may be performed in a MAC entity, or it may be performed as well in a physical layer when a collision for a packet received from a MAC entity and to be transmitted occurs. For example, when the above process is performed in a physical layer, it may be performed when determining a packet to be transmitted first among relay packets and uplink packets. For example, a process of selecting which data to transmit to a base station through direct comparison of priorities may include a process of determining which MAC PDU to generate first in a MAC entity, creating an uplink MAC PDU, and sending it down to a physical layer.

Figure 10:
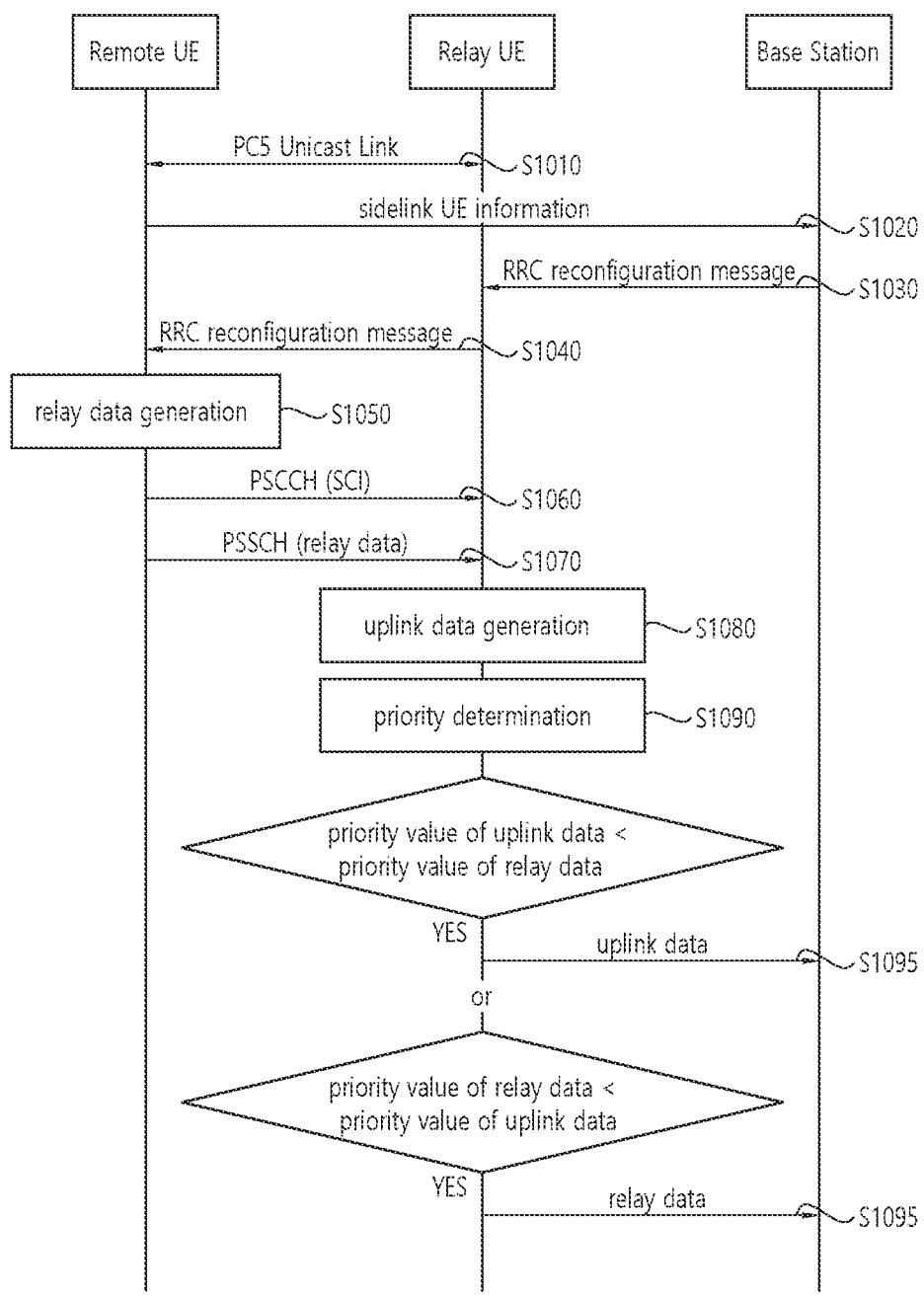
FIG. 10 shows a procedure for a relay UE to compare priorities of relay data and uplink data/signal according to an embodiment of the present disclosure.

FIG. 10 shows a procedure for a relay UE to compare priorities of relay data and uplink data/signal according to an embodiment of the present disclosure. The embodiment of FIG. 10 may be combined with various embodiments of the present disclosure.

Referring to FIG. 10, in step S1010, a remote UE may establish a PC5 unicast link with a relay UE. In step S1020, the remote UE may transmit sidelink UE information to a base station. For example, the sidelink UE information may include quality of service (QoS) information for relay data and information related to a relay UE. In step S1030, the relay UE may receive an RRC reconfiguration message from the base station. For example, the RRC reconfiguration message may include information related to a mapping relationship between a layer 1 SL priority and a layer 1 UL priority. For example, in step S1040, the relay UE may transmit a PC5 RRC message to the remote UE. For example, the PC5 RRC message may include information related to the mapping relationship. For example, in step S1050, relay data may be generated in the remote UE. For example, a remote UE may generate data to transmit through relay communication. In step S1060, the remote UE may transmit sidelink control information (SCI) to the relay UE through a physical sidelink control channel (PSCCH). For example, the PSCCH and/or the SCI may include information related to the mapping relationship. In step S1070, the remote UE may transmit an SL packet for the generated relay data through a physical sidelink shared channel (PSSCH) based on the SCI. For example, the destination of the SL packet may be the base station. In step S1080, uplink (UL) data may be generated in the relay UE. In step S1090, the relay UE may determine data to be transmitted to the base station by comparing priorities between the relay data and the UL data. That is, the relay UE may determine a priority between the two data. For example, when a value related to a priority of the uplink data is smaller than a value related to a priority of the relay data, in step S1095, the relay UE may transmit the uplink data to the base station. Or, for example, when the value related to the priority of the relay UE is smaller than the value related to the priority of the uplink data, in step S1095, the relay UE may transmit the relay data to the base station.

Figure 11:
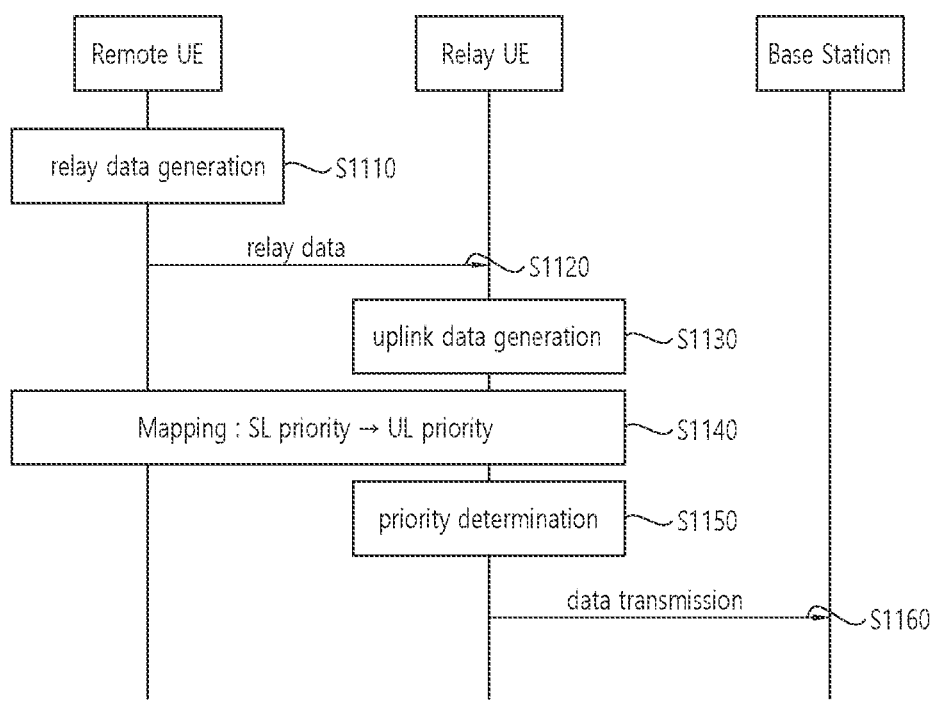
FIG. 11 shows a procedure where a relay UE transmits data to a base station by comparing priorities of relay data and uplink data, according to an embodiment of the present disclosure.

FIG. 11 shows a procedure where a relay UE transmits data to a base station by comparing priorities of relay data and uplink data, according to an embodiment of the present disclosure. The embodiment of FIG. 11 may be combined with various embodiments of the present disclosure.

Referring to FIG. 11, in step S1110, a remote UE may generate relay data. Or, for example, the relay data may be generated in the remote UE. In step S1120, the remote UE may transmit the relay data to a relay UE. In step S1130, the relay UE may generate its own uplink data. Or, for example, the uplink data may be generated in the relay UE. In step S1140, the remote UE or the relay UE may map a value related to an SL priority of the relay data to a value related to a UL priority. For example, the mapping may be mapped based on a mapping relationship of a value related to an SL priority and a value related to a UL priority, received from a base station. For example, the step S1140 may be performed before the step S1120. When the step S1140 is performed before the step S1120, in the step S1120, the remote UE may transmit a value related to a UL priority mapped from a value related to an SL priority of the relay UE along with the relay data to the relay UE. In step S1150, the relay UE may determine which data has a higher priority based on the mapped value related to the UL priority of the relay data and a value related to the UL priority of the uplink data. In step S1160, the relay UE may transmit data with the higher priority, determined in the step S1150, to the base station.

Figure 12:
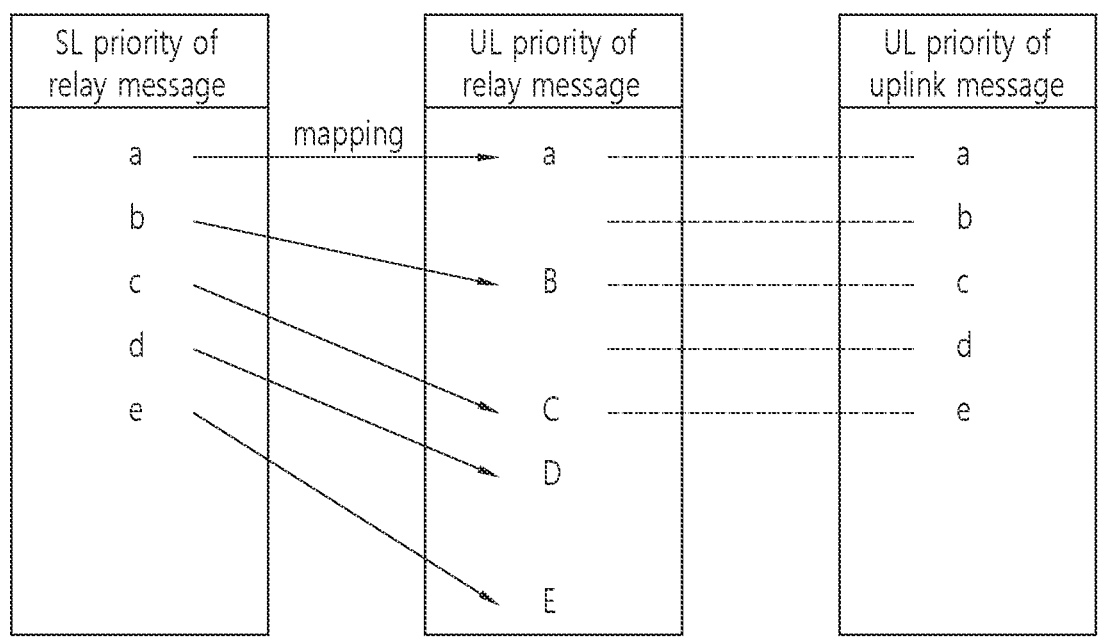
FIG. 12 shows a mapping relationship of a value related to an SL priority of relay data and a value related to a UL priority of the relay data.

FIG. 12 shows a mapping relationship of a value related to an SL priority of relay data and a value related to a UL priority of the relay data. The embodiment of FIG. 12 may be combined with various embodiments of the present disclosure.

Referring to FIG. 12, five values that a value related to an SL priority of relay data may have are exemplified. A mapping relationship between a value related to an SL priority of relay data and a value related to a UL priority of the relay data described in the present disclosure is not limited to the embodiment. For example, a value related to an SL priority of relay data may have a value other than the five values.

For example, if a value related to an SL priority of relay data is 'a', when the value related to the SL priority of the relay data is mapped to a value related to the UL priority, the value related to the UL priority after mapping may still be 'a'. In this case, the relay data may have a priority equal to uplink data with a value related to a UL priority of 'a', and may have a priority higher than uplink data with a value related to a UL priority greater than 'a'.

For example, if a value related to an SL priority of relay data is 'b', when the value related to the SL priority of the relay data is mapped to a value related to the UL priority, the value related to the UL priority after mapping may be 'B' greater than 'b'. For example, the 'B' may be equal to 'c'. In this case, the relay data may have a priority lower than uplink data with a value related to a UL priority smaller than 'c', may have a priority equal to uplink data with a value related to a UL priority of 'c', and may have a priority higher than uplink data with a value related to a UL priority greater than 'c'.

For example, if a value related to an SL priority of relay data is 'c', when the value related to the SL priority of the relay data is mapped to a value related to the UL priority, the value related to the UL priority after mapping may be 'C' greater than 'c'. For example, the 'C' may be equal to 'e'. In this case, the relay data may have a priority lower than uplink data with a value related to a UL priority smaller than 'e', may have a priority equal to uplink data with a value related to a UL priority of 'e', and may have a priority higher than uplink data with a value related to a UL priority greater than 'e'.

For example, also in the case where the value related to an SL priority of a relay message is 'd' or 'e', when comparing priorities with uplink messages with values related to UL priorities that is the same as above, 'd' or 'e', as in the case where values related to the SL priority of the above-described relay messages are 'a', 'b', and 'c', the priority comparison relationship may be different after mapping.

According to an embodiment of the present disclosure, so that a transmission of Uu data (Uu data for a relay UE to transmit relay data to a base station, transmitted by a remote UE to the relay UE) related to the remote UE has priority over the relay UE's own uplink data, the base station may signal time resource domain information #A for the transmission of the Uu data related to the remote UE, to the relay UE. For example, the time resource domain information #A may be in the form of a slot-based bitmap. For example, the time resource domain information #A may be separately configured/signaled with time resource domain information #B for sidelink transmission or sidelink reception of the relay UE and time resource domain information #C for uplink transmission of the relay UE itself. In addition, for example, the method described in the present disclosure, for example, a transmission priority determination method between Uu data transmission related to a remote UE and uplink data transmission of a relay UE itself may be applied only outside the time point designated by time resource domain information #A. That is, at a time point designated by time resource domain information #A, Uu data transmission related to a remote UE is given the highest priority, and at other times, a priority-based transmission priority determination method may be applied.

Meanwhile, although the above description has focused on an operation of a method for determining the priority of data transmission, between relay data received by a relay UE from a remote UE and uplink data of the relay UE itself, using a Uu link. The above-described technical features may also be applied to an operation of a method for determining transmission priority between data of a remote UE. That is, the above technical features may be applied to an operation for a transmission priority determination method when there is a collision between relay data transmitted by a remote UE to a relay UE through a sidelink and uplink data transmitted by the remote UE to a base station through a Uu link.

According to various embodiments of the present disclosure, when only one uplink MAC PDU for one of uplink data for relaying relay data received by a relay UE from a remote UE and uplink data generated by the relay UE can be transmitted to a base station, the relay UE determines data having a high priority so that the data having a high priority can be transmitted first, through the method proposed in the present disclosure. For example, the data having a high priority may include uplink data with high QoS requirements.

Figure 13:
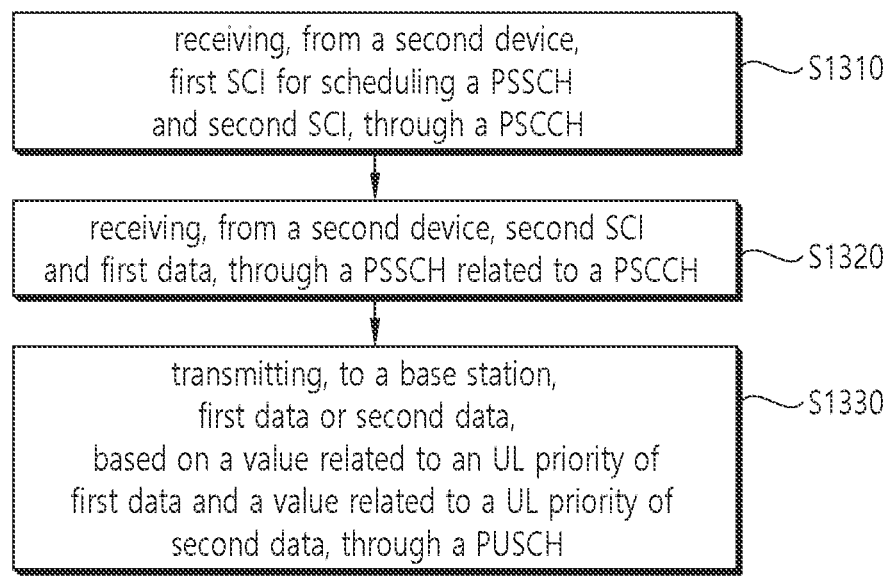
FIG. 13 shows a procedure for performing wireless communication by a first device according to an embodiment of the present disclosure.

FIG. 13 shows a procedure for performing wireless communication by a first device according to an embodiment of the present disclosure. The embodiment of FIG. 13 may be combined with various embodiments of the present disclosure.

Referring to FIG. 13, in step S1310, a first device may receive, from a second device, first sidelink control information (SCI) for scheduling a physical sidelink shared channel (PSSCH) and second SCI, through a physical sidelink control channel (PSCCH). In step S1320, the first device may receive, from the second device, the second SCI and first data, through the PSSCH related to the PSCCH. In step S1330, the first device may transmit, to a base station, the first data or second data, based on a value related to an uplink (UL) priority of the first data and a value related to a UL priority of the second data, through a physical uplink shared channel (PUSCH). For example, the value related to the UL priority of the first data may be mapped from a value related to a sidelink (SL) priority of the first data.

For example, the value related to the SL priority of the first data may be mapped to the value related to the UL priority of the first data by the second device.

For example, additionally, the first device may receive, from the second device, the value related to the SL priority of the first data. For example, the value related to the SL priority of the first data may be mapped to the value related to the UL priority of the first data by the first device.

For example, the value related to the SL priority of the first data may be received as included in the first SCI.

For example, additionally, the first device may receive, from the base station, information related to a mapping relationship of the value related to the UL priority of the first data and the value related to the SL priority of the first data.

For example, information related to a mapping relationship of the value related to the UL priority of the first data and the value related to the SL priority of the first data may be configured from the base station.

For example, the first data or the second data may be transmitted based on a result of comparison of the value related to the UL priority of the first data and the value related to the UL priority of the second data.

For example, the first data may be transmitted to the base station, based on the value related to the UL priority of the first data being smaller than the value related to the UL priority of the second data.

For example, the second data may be transmitted to the base station, based on the value related to the UL priority of the first data being greater than the value related to the UL priority of the second data.

For example, the second data may be generated in the first device.

For example, the value related to the SL priority of the first data may be the smallest value among values related to a priority of at least one logical channel related to generation of the first data.

For example, the value related to the UL priority of the second data may be the smallest value among values related to a priority of at least one logical channel related to generation of the second data.

The above-described embodiment may be applied to various devices described below. For example, a processor 102 of a first device 100 may control a transceiver 106 to receive, from a second device 200, first sidelink control information (SCI) for scheduling a physical sidelink shared channel (PSSCH) and second SCI, through a physical sidelink control channel (PSCCH). And, the processor 102 of the first device 100 may control the transceiver 106 to receive, from the second device 200, the second SCI and first data, through the PSSCH related to the PSCCH. And, the processor 102 of the first device 100 may control the transceiver 106 to transmit, to a base station, the first data or second data, based on a value related to an uplink (UL) priority of the first data and a value related to a UL priority of the second data, through a physical uplink shared channel (PUSCH). For example, the value related to the UL priority of the first data may be mapped from a value related to a sidelink (SL) priority of the first data.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive, from a second device, first sidelink control information (SCI) for scheduling a physical sidelink shared channel (PSSCH) and second SCI, through a physical sidelink control channel (PSCCH); receive, from the second device, the second SCI and first data, through the PSSCH related to the PSCCH; and transmit, to a base station, the first data or second data, based on a value related to an uplink (UL) priority of the first data and a value related to a UL priority of the second data, through a physical uplink shared channel (PUSCH), wherein the value related to the UL priority of the first data may be mapped from a value related to a sidelink (SL) priority of the first data.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: receive, from a second UE, first sidelink control information (SCI) for scheduling a physical sidelink shared channel (PSSCH) and second SCI, through a physical sidelink control channel (PSCCH); receive, from the second UE, the second SCI and first data, through the PSSCH related to the PSCCH; and transmit, to a base station, the first data or second data, based on a value related to an uplink (UL) priority of the first data and a value related to a UL priority of the second data, through a physical uplink shared channel (PUSCH), wherein the value related to the UL priority of the first data may be mapped from a value related to a sidelink (SL) priority of the first data.

According to an embodiment of the present disclosure, a non-transitory computer-readable storage medium storing instructions may be proposed. For example, the instructions, when executed, may cause a first device to: receive, from a second device, first sidelink control information (SCI) for scheduling a physical sidelink shared channel (PSSCH) and second SCI, through a physical sidelink control channel (PSCCH); receive, from the second device, the second SCI and first data, through the PSSCH related to the PSCCH; and transmit, to a base station, the first data or second data, based on a value related to an uplink (UL) priority of the first data and a value related to a UL priority of the second data, through a physical uplink shared channel (PUSCH), wherein the value related to the UL priority of the first data may be mapped from a value related to a sidelink (SL) priority of the first data.

Figure 14:
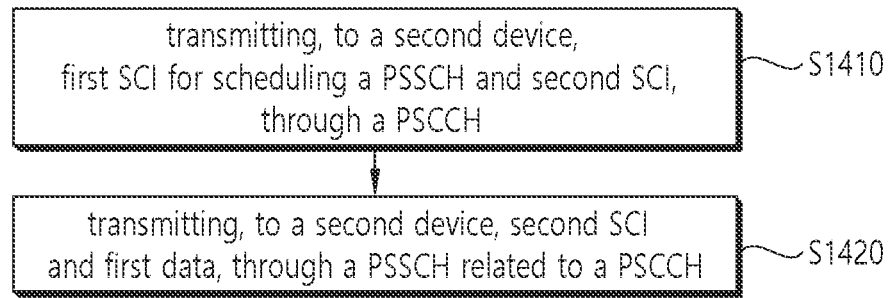
FIG. 14 shows a procedure for a second device to perform wireless communication according to an embodiment of the present disclosure.

FIG. 14 shows a procedure for a second device to perform wireless communication according to an embodiment of the present disclosure. The embodiment of FIG. 14 may be combined with various embodiments of the present disclosure.

Referring to FIG. 14, in step S1410, a second device may transmit, to a second device, first sidelink control information (SCI) for scheduling a physical sidelink shared channel (PSSCH) and second SCI, through a physical sidelink control channel (PSCCH). In step S1420, the second device may transmit, to the second device, the second SCI and first data, through the PSSCH related to the PSCCH. For example, the first data or second data may be transmitted to a base station, based on a value related to an uplink (UL) priority of the first data and a value related to a UL priority of the second data, through a physical uplink shared channel (PUSCH), and the value related to the UL priority of the first data may be mapped from a value related to a sidelink (SL) priority of the first data.

For example, additionally, the second device may transmit, to the base station, information related to a quality of service (QoS) requirement related to the first data and the first device. For example, the value related to the UL priority of the first data may be mapped from the value related to the SL priority of the first data based on information related to a mapping relationship of the value related to the UL priority of the first data and the value related to the SL priority of the first data, and the information related to the mapping relationship of the value related to the UL priority of the first data and the value related to the SL priority of the first data may be configured from the base station, based on the information related to the QoS requirement and the first device.

The above-described embodiment may be applied to various devices described below. For example, a processor 202 of a second device 200 may control a transceiver 206 to transmit, to a first device 100, first sidelink control information (SCI) for scheduling a physical sidelink shared channel (PSSCH) and second SCI, through a physical sidelink control channel (PSCCH). And, the processor 202 of the second device 200 may control the transceiver 206 to transmit, to the first device 100, the second SCI and first data, through the PSSCH related to the PSCCH. For example, the first data or second data may be transmitted to a base station, based on a value related to an uplink (UL) priority of the first data and a value related to a UL priority of the second data, through a physical uplink shared channel (PUSCH), and the value related to the UL priority of the first data may be mapped from a value related to a sidelink (SL) priority of the first data.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: transmit, to a first device, first sidelink control information (SCI) for scheduling a physical sidelink shared channel (PSSCH) and second SCI, through a physical sidelink control channel (PSCCH); and transmit, to the first device, the second SCI and first data, through the PSSCH related to the PSCCH, wherein the first data or second data may be transmitted to a base station, based on a value related to an uplink (UL) priority of the first data and a value related to a UL priority of the second data, through a physical uplink shared channel (PUSCH), and wherein the value related to the UL priority of the first data may be mapped from a value related to a sidelink (SL) priority of the first data.

For example, additionally, the one or more processor may execute the instructions to: transmit, to the base station, the information related to the QoS requirement related to the first data and the first device, wherein the value related to the UL priority of the first data may be mapped from the value related to the SL priority of the first data based on information related to a mapping relationship of the value related to the UL priority of the first data and the value related to the SL priority of the first data, and wherein the information related to the mapping relationship of the value related to the UL priority of the first data and the value related to the SL priority of the first data may be configured from the base station, based on the information related to the QoS requirement and the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
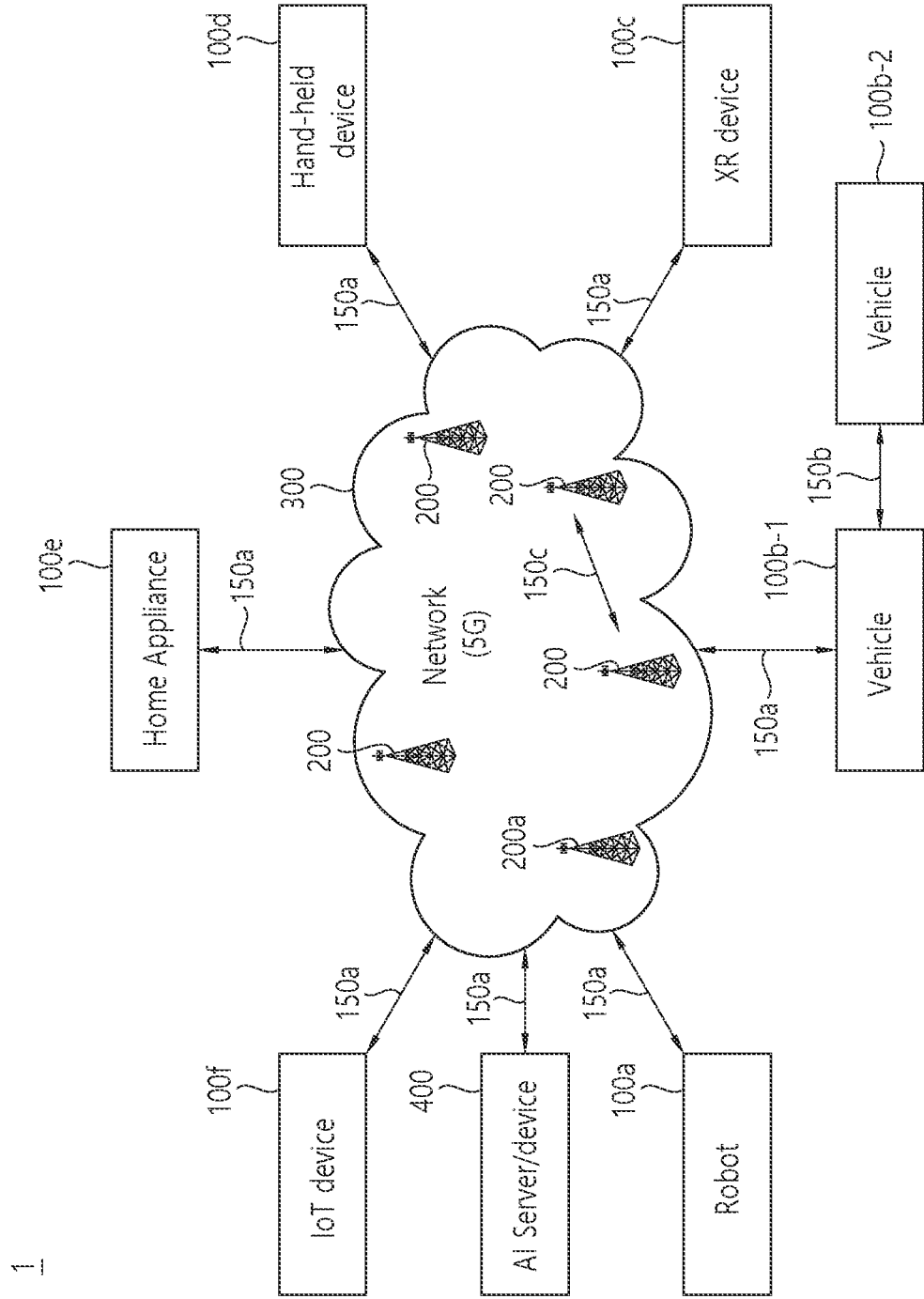
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
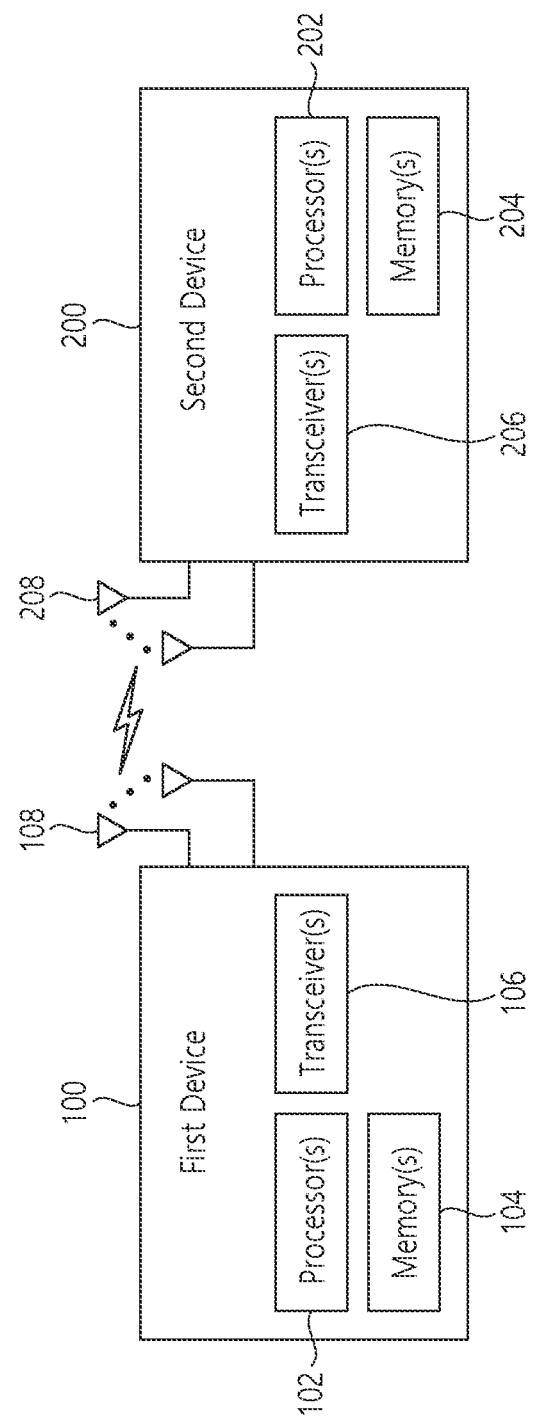
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or (the wireless device 100x and the wireless device 100x) of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs). Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
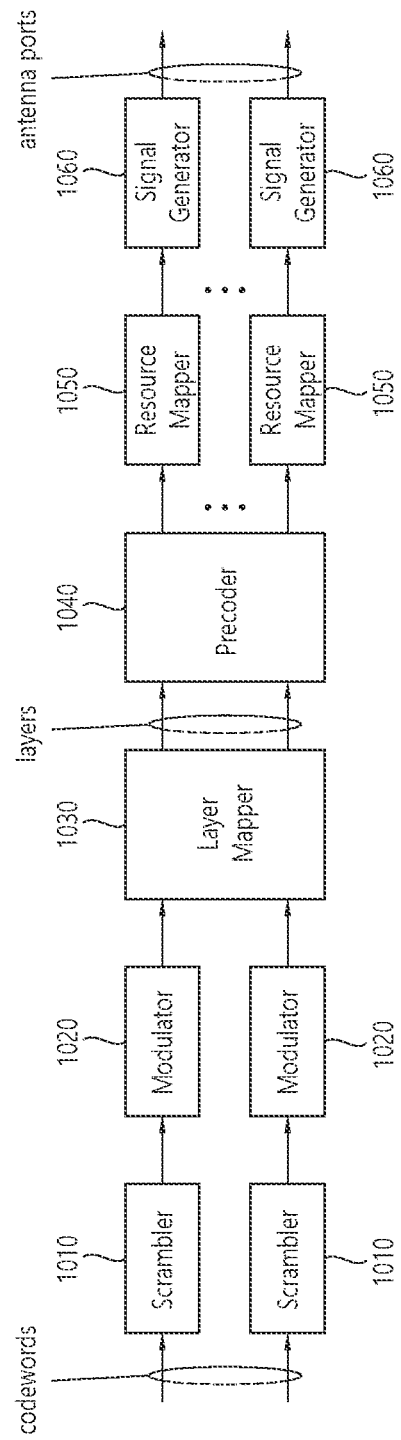
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
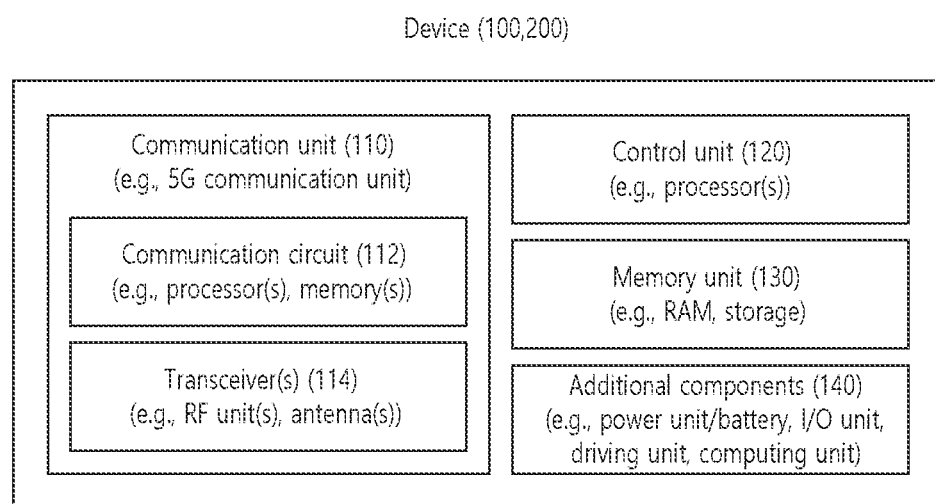
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles 100-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
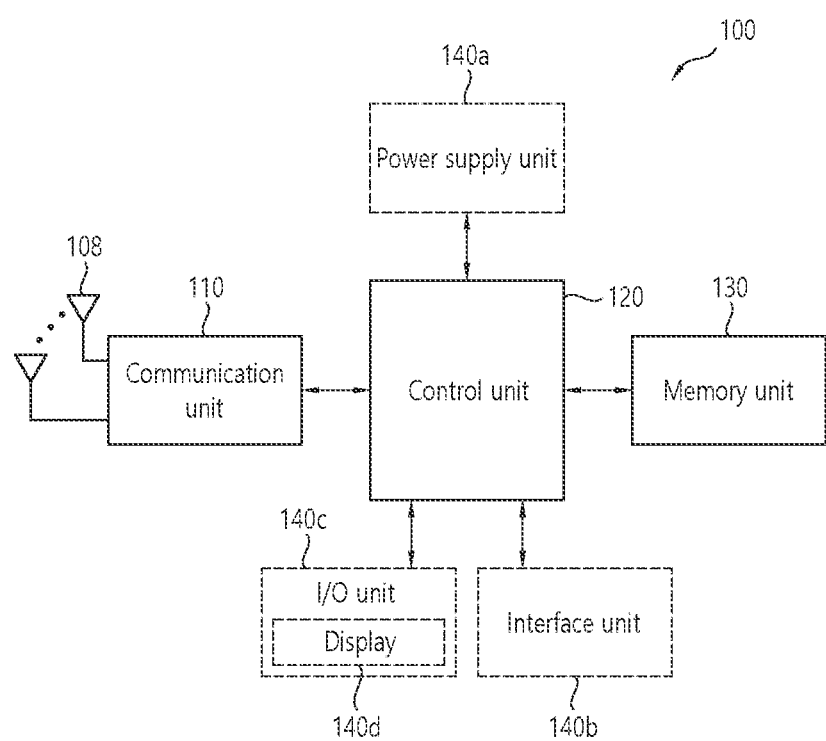
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
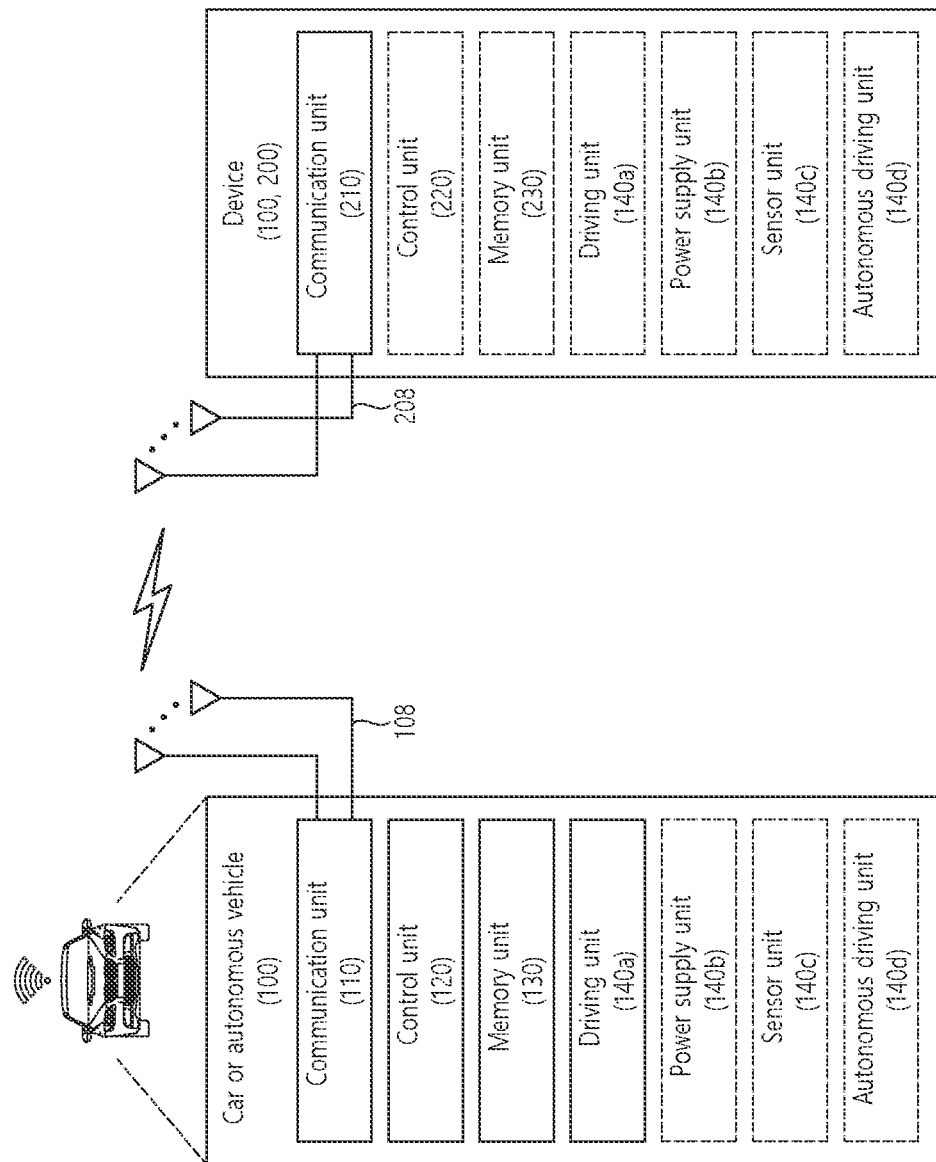
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
    receiving, by a first device, from a base station, a mapping relationship of a value related to an uplink (UL) priority of a first data and a value related to a sidelink (SL) priority of the first data;
    forwarding, by the first device, to a second device, the mapping relationship;
    receiving, by the first device, from the second device, first sidelink control information (SCI) for scheduling a physical sidelink shared channel (PSSCH) and second SCI, through a physical sidelink control channel (PSCCH),
    wherein the first SCI includes a value related to an UL priority of the first data,
    wherein the value related to the UL priority of the first data is mapped from a value related to a SL priority of the first data, based on the forwarded mapping relationship;
    receiving, by the first device, from the second device, the second SCI and the first data, through the PSSCH related to the PSCCH; and
    transmitting, by the first device, to the base station, the first data or second data, based on a value related to an UL priority of the first data and a value related to a UL priority of the second data, through a physical uplink shared channel (PUSCH).

2. The method of claim 1, wherein the first data or the second data is transmitted based on a result of comparison of the value related to the UL priority of the first data and the value related to the UL priority of the second data.

3. The method of claim 2, wherein the first data is transmitted to the base station, based on the value related to the UL priority of the first data being smaller than the value related to the UL priority of the second data.

4. The method of claim 2, wherein the second data is transmitted to the base station, based on the value related to the UL priority of the first data being greater than the value related to the UL priority of the second data.

5. The method of claim 1, wherein the first data and the second data overlap.

6. The method of claim 1, wherein the second data is generated in the first device.

7. The method of claim 1, wherein the value related to the SL priority of the first data is a smallest value among values related to a priority of at least one logical channel related to generation of the first data.

8. The method of claim 1, wherein the value related to the UL priority of the second data is a smallest value among values related to a priority of at least one logical channel related to generation of the second data.

9. A first device comprising:
    at least one transceiver;
    at least one processor; and
    at least one memory connected to the at least one processor and storing instructions that, based on being executed by the at least one processor, perform operations comprising:
    receiving, by a first device, from a base station, a mapping relationship of a value related to an uplink (UL) priority of a first data and a value related to a sidelink (SL) priority of the first data;
    forwarding, by the first device, to a second device, the mapping relationship;
    receiving, by the first device, from the second device, first sidelink control information (SCI) for scheduling a physical sidelink shared channel (PSSCH) and second SCI, through a physical sidelink control channel (PSCCH),
    wherein the first SCI includes a value related to an UL priority of the first data,
    wherein the value related to the UL priority of the first data is mapped from a value related to a SL priority of the first data, based on the forwarded mapping relationship;
    receiving, by the first device, from the second device, the second SCI and the first data, through the PSSCH related to the PSCCH; and
    transmitting, by the first device, to the base station, the first data or second data, based on a value related to an UL priority of the first data and a value related to a UL priority of the second data, through a physical uplink shared channel (PUSCH).

10. A processing device comprising:
    at least one processor; and
    at least one memory connected to the at least one processor and storing instructions that, based on being executed by the at least one processor, cause a first device to perform operations comprising:
    receiving, by a first device, from a base station, a mapping relationship of a value related to an uplink (UL) priority of a first data and a value related to a sidelink (SL) priority of the first data;
    forwarding, by the first device, to a second device, the mapping relationship;
    receiving, by the first device, from the second device, first sidelink control information (SCI) for scheduling a physical sidelink shared channel (PSSCH) and second SCI, through a physical sidelink control channel (PSCCH), wherein the first SCI includes a value related to an UL priority of the first data, wherein the value related to the UL priority of the first data is mapped from a value related to a SL priority of the first data, based on the forwarded mapping relationship;

receiving, by the first device, from the second device, the second SCI and the first data, through the PSSCH related to the PSCCH; and transmitting, by the first device, to the base station, the first data or second data, based on a value related to an UL priority of the first data and a value related to a UL priority of the second data, through a physical uplink shared channel (PUSCH).

* * * * *